March 23, 1926.
H. W. MORGAN
NAILING MACHINE
Filed Nov. 16, 1922
1,577,841
2 Sheets-Sheet 1
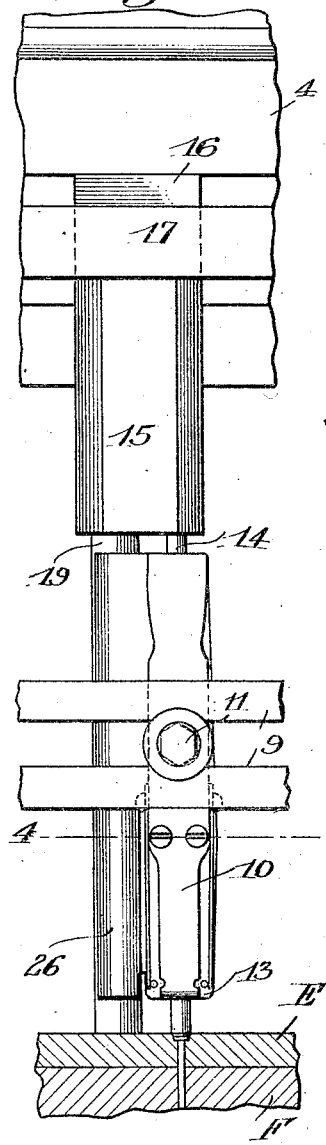
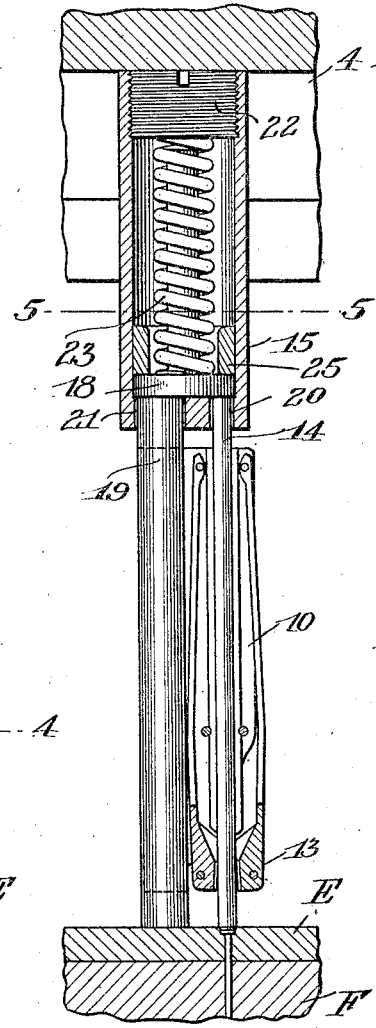
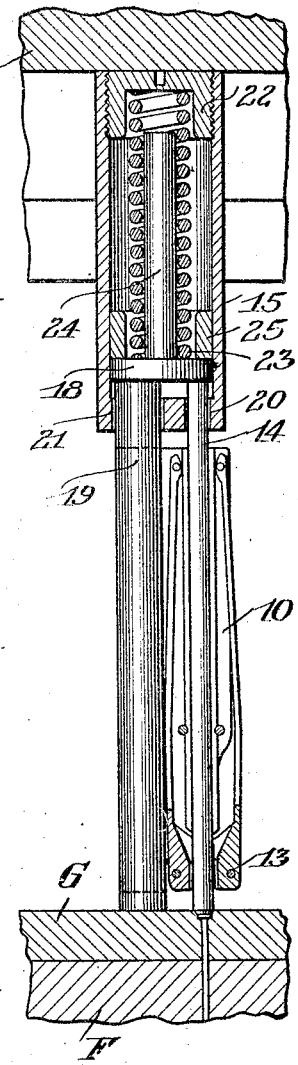
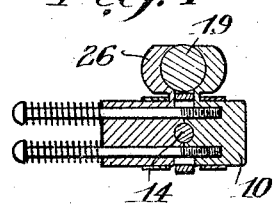
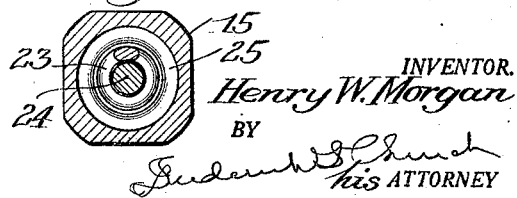
INVENTOR.
Henry W. Morgan
BY
his ATTORNEY

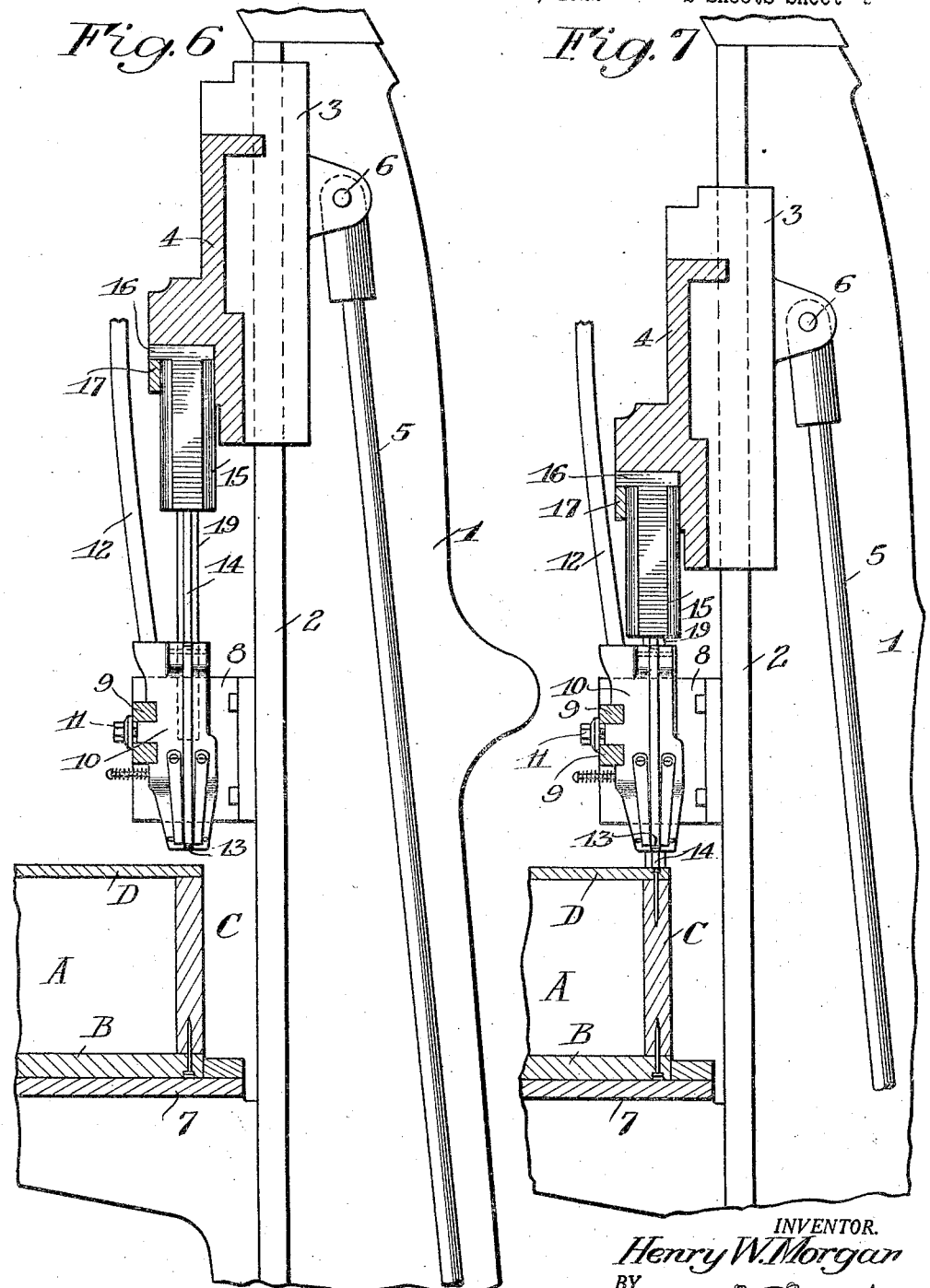

Patented Mar. 23, 1926.

1,577,841

UNITED STATES PATENT OFFICE.

HENRY W. MORGAN, OF ROCHESTER, NEW YORK.

NAILING MACHINE.

Application filed November 16, 1922. Serial No. 601,433.

*To all whom it may concern:*

Be it known that I, HENRY W. MORGAN, a citizen of the United States, residing at Rochester, in the county of Monroe and State of New York, have invented certain new and useful Improvements in Nailing Machines; and I do hereby declare the following to be a full, clear, and exact description of the same, reference being had to the accompanying drawing, forming a part of this specification, and to the reference numerals marked thereon.

My present invention relates to machinery and more particularly to nailing machines and has for its object to improve the driving mechanism of these machines in such manner that it will be self-adjusting when operating upon work pieces of different thicknesses whereas it has hitherto been necessary to make fixed adjustments of the nailing mechanism for each thickness of work or else raise the thinner pieces on the table of the machine. To these and other ends the invention resides in certain improvements and combinations of parts all as will be hereinafter described, the novel features being pointed out in the claims at the end of the specification.

In the drawings:

Figure 1 is a front view partly broken away and with a fragment of the work piece in section showing the driving mechanism of a nailing machine constructed in accordance with and illustrating one embodiment of my invention;

Figure 2 is a vertical central section through the same;

Figure 3 is a section similar to Figure 2 illustrating its action upon a work piece of greater thickness;

Figure 4 is a horizontal or tranverse section on the line 4—4 Figure 1;

Figure 5 is a horizontal or transverse section on the line 5—5 Figure 2;

Figure 6 is a side view of the driving mechanism partly in section through the work piece and through an adjacent fragment of the machine, and Figure 7 is a view like Figure 6 but with the parts in another position.

Similar reference numerals throughout the several views indicate the same parts.

To first identify general features of the machine, 1 indicates the vertical side frame of a nailing machine provided with ways 2 upon which reciprocate vertically the guides 3 of the cross head 4 constituting the driving head of the driving mechanism. The head is reciprocated vertically by a pitman 5 connected to it by a wrist pin 6 and actuated by mechanism which does not concern the present invention.

Secured to the front of the frame beneath the driving head is a table 7 for the work which, in the present embodiment and description we will assume to be boxes. Immediately above the table there is mounted on the frame 1 by means of brackets 8 cross bars 9 upon which the castings 10 containing the nail chucks are adjustably secured by bolts 11. The nails are fed to the chucks from above through tubes 12 and are driven through the lower ends 13 of the chuck jaws by the drivers 14.

Assuming that a box of the general nature shown at A is to be nailed, the chuck holding devices are adjusted so that the mouth of the chuck 13 will clear by the proper distance the top surface of the completed box and then the travel or stroke of the driving head 4 is adjusted by means not shown to carry the driver 14 on the driving stroke just far enough out of the mouth of the chuck to set the nail head the desired distance in the work piece. Heretofore it has been necessary to have the surface in which the nail is driven always in the safe plane for a given adjustment of the nailing mechanism because the driver was positively driven on a set stroke and it would not drive the nails and set them uniformly in the work unless this condition obtained. Therefore, in constructing a box of the nature shown at A in Figures 6 and 7 it was necessary, in first nailing one of the tops B to the ends C, to place the other unnailed top D beneath the said end to bring the surface of B up high enough enough for the driver. The box was then turned over to the position of said fingers and the top D nailed in place with the surface thereof in the same plane previously occupied by that of the top D. This, however, necessitated holding the three loose pieces together in a sort of balanced relationship on the table while the preliminary nailing was being done which was difficult and inconvenient, the manipulation of the un-nailed top during the nailing of the other resulting in a considerable loss of time.

It is obviously much easier for the operator to merely place the end C edge wise on the table 7; nail one top piece to it at the height of its own thickness plus the height of the end piece; to turn these two over and then apply the other top and nail it at a greater height or at one to which its own thickness has been added. With my present invention this can be done without readjustment of the driving head for the following reasons:

Instead of mounting the driver 14 in fixed relationship to the driving head 4, I provide the latter with a hollow, tubular guide casing 15 formed with a forwardly projecting lug 16 by means of which it is retained in the head by the usual transverse locking bar 17. Inside of this guide case is a block 18 to which is fixed the driver 14 and a stop 19 preferably rigidly connected to and located parallel with the driver. They project through bearings in the bottom of the guide case as indicated at 20 and 21 by which bearings they are guided in conjunction with the bearing of the block 18 on the inside of the case. The stop 19 at its lower or work abutting end is of substantially greater area than the corresponding surface of the driver and the latter projects beyond the stop a distance equal to the desired set to be given the nail.

The upper end of the guide case 15 is closed by an adjustable threaded plug 22 having a cupped interior and interposed between this plug and the guide block 18 is a compression spring 23. The spring is held centered by a floating pin or post 24 which it surrounds and by a collar 25 surrounding the lower end of the spring to rest on the guide block and closely fitting the interior of the guide case. It will thus be seen that the driver and stop are capable of yielding and that the driving head presses the driver downwardly only through the medium of this spring 23. The operation is as follows:

The driver carries the nail through and out of the end of the chuck (in the casting of which the stop 19 is also guided at 26) in the usual manner. The stroke of the driving head 4 is adjusted to advance the driver, without compressing the spring 23, a maximum distance that will just drive the nail home, and no more, on the lowest working surface. Such surface would be presented in nailing the first cover on the end piece C, the cover D being absent. The two angled pieces B and C are then turned over and the cover D applied as in Figure 6 which raises the working surface a distance equal to its thickness. Upon this stroke of the head and driver the stop 19, nevertheless, strikes the surface of the work and halts the driver 14 so that it drives and sets the nail only as far as the driver projects beyond the abutting end of the stop. The rest of the normal travel of the driving head 4 is not effective upon the driver but is taken up by the compression of the spring 23. Of course the latter must be sufficiently strong to drive the nail without yielding until the stop abuts the work but not strong enough to cause the stop to injure the work, such injury being further provided against by giving sufficient area to the abutting end of the stop.

The respective maximum and reduced strokes of the driver in another contingency are shown in a comparative way in Figures 2 and 3 both of which show the driving head 4 at its lower limitive movement as evidenced by its same position in the two figures while in the two cases the driver has completed its nailing stroke at two different elevations. Considering also Figure 1, in Figures 1 and 2 a relatively thin element E is being nailed to an element F while in Figure 3 a relatively thicker element G is being nailed to the same element F. Note that in Figure 2 the spring 23 has not been compressed at all while in Figure 3 it is partially compressed.

The yielding nature of the driver of my invention is also useful in preventing injury to the machine or the work piece in case a heavy nail strikes a strong obstruction or some impenetrable element is laid in the path of the driver.

I claim as my invention:

1. In a nailing machine, the combination with an expansible chuck and a driver operable therethrough, of a stop adapted to engage the work to limit the movement of the driver, a driving head, and a resilient element operated by the head and adapted to yieldably actuate the driver during the driving operation.

2. In a nailing machine, the combination with an expansible chuck and a driver operable therethrough, of a stop rigidly related to the driver and adapted to abut a substantially greater surface of the work, a spring for actuating said elements, and a driving head adapted to compress the spring to effect a driving operation.

3. In a nailing machine, the combination with a stop adapted to abut a substantial area of the work surface and a parallel driver rigidly related thereto but projecting beyond the end thereof, a spring for actuating said elements, and a driving head adapted to compress the spring to effect a driving operation.

4. In a nailing machine, the combination with a driving head and a hollow guide casing carried thereby, an expansible chuck, a driver operable through the chuck, of a stop guided in the casing and adapted to abut a substantially greater surface of the work than the driver, and a spring in the guide casing through which the driving head actuates the stop and driver.

5. In a nailing machine, the combination with a driving head and a hollow guide casing carried thereby, of a block guided in the casing and having a centering post thereon, a driver, a stop rigidly connected to the block and projecting from the casing, the stop being adapted to abut a substantially greater surface of the work than the driver, and a spring in the guide casing surrounding the post and through which the driving head actuates the stop and driver.

6. In a nailing machine, the combination with an expansible chuck, a driving head and a hollow guide casing carried by the head, of a block guided in the casing and having a centering post thereon, a driver, a stop rigidly connected to the block and projecting from the casing, the stop being adapted to abut a substantially greater surface of the work than the driver, a spring in the guide casing surrounding the post and through which the driving head actuates the stop and driver, and an adjustable plug in the end of the casing upon which the spring takes its bearing.

7. In a nailing machine, the combination with an expansible chuck, a driving head and a hollow guide casing carried by the head, of a driver, a stop for limiting its stroke, the driver being guided in the casing and by the chuck, and a spring through which the driving head actuates the stop and yieldingly actuates the driver during the driving operation.

8. In a nailing machine, the combination with a driving head an expansible chuck and a driver operable therethrough, of a stop movable relative to and exteriorly of the chuck adapted to engage the work to limit the movement of the driver, and means actuated by the head for yieldably operating the driver during the driving operation.

9. In a nailing machine, the combination with a frame and a work holder thereon, a nailing head mounted upon the frame for movement toward and from the work holder, of a support located between the holder and the nailing head, a chuck upon the support, a driver yieldably operated by the nailing head during the driving operation, and a stop located at one side of the driver and adapted to engage the work to limit the movement of the driver.

10. In a nailing machine, the combination with a frame and a work holder thereon, a nailing head reciprocably mounted upon the frame, of a support located between the nailing head and the work, a chuck upon the support, a driver operable through the chuck, a stop located adjacent the chuck and adapted to engage the work to limit the movement of the driver, and yieldable operating means for yieldably actuating the driver during the driving operation adapted to be actuated by the nailing head.

HENRY W. MORGAN.